No. 886,393. PATENTED MAY 5, 1908.
T. W. MORGAN.
LINER FOR CENTRIFUGAL CREAM SEPARATORS.
APPLICATION FILED DEC. 14, 1906.

WITNESSES:

INVENTOR
Thomas W. Morgan,
BY
ATTORNEY ical series of separated superposed truncated

UNITED STATES PATENT OFFICE.

THOMAS W. MORGAN, OF WATERLOO, IOWA, ASSIGNOR TO WILBUR W. MARSH, OF WATERLOO, IOWA.

LINER FOR CENTRIFUGAL CREAM-SEPARATORS.

No. 886,393.     Specification of Letters Patent.     Patented May 5, 1908.

Application filed December 14, 1906. Serial No. 347,788.

*To all whom it may concern:*

Be it known that I, THOMAS W. MORGAN, a citizen of the United States of America, and a resident of Waterloo, Blackhawk county, Iowa, have invented certain new and useful Improvements in Liners for Centrifugal Cream-Separators, of which the following is a specification.

My invention relates to improvements in liners for centrifugal cream separators, and the object of my improvements is to provide a liner made up of a series of superposed truncated cones, hollow and spaced apart, and provided with means for permitting a current of the entering milk to ascend through channels therein, and having appropriate means for keeping such cones in the alinement necessary in order to keep the said vertical channels unobstructed. This object I have accomplished by the means which are hereinafter described and claimed, and which are illustrated in the accompanying drawings, in which—

Figure 1:
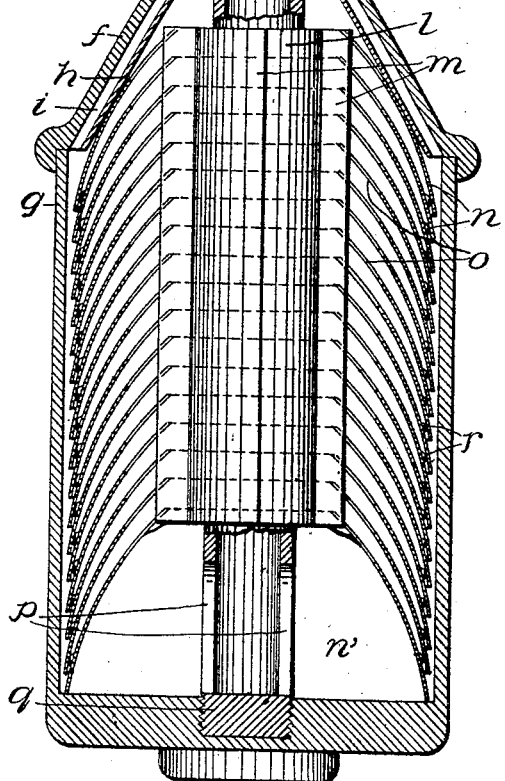
Figure 2:
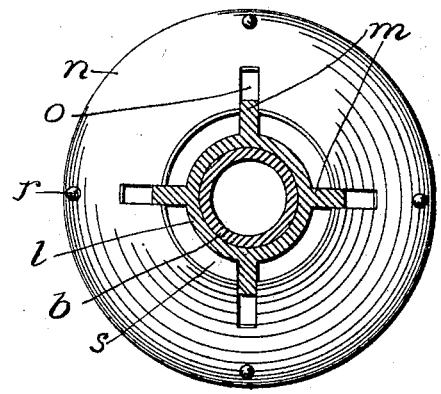

Figure 1 is a central axial vertical section of a centrifugal cream separator bowl containing my improved liner, and Fig. 2 is a plan view of my improved separating cone, showing the manner in which it is kept in a certain fixed position in the bowl.

Similar letters refer to similar parts throughout the several views.

I have shown a centrifugal cream separator of an ordinary type whose bowl $g$ is provided with a conical cover $f$. The latter has a cylindrical extension $d$ provided with milk exits $e$ and cream exits $c$. Said cover $f$ is held when in operative position tightly in contact with the upper edge of the bowl $g$ by means of a clamping bolt $b$ whose flange $a$ contacts with the upper edge of the cylindrical extension $d$, the lower threaded end $q$ of said bolt engaging a threaded opening in the bottom of the bowl. A conical separating device $h$ is fitted within the conical cover $s$ and has a flange $k$ which contacts with the inner periphery of the cylindrical extension $d$ between the milk exits $e$ and the cream exits $c$. This separating device $h$ is spaced away sufficiently from the inner periphery of the cover $f$ to provide a space $i$ in communication with the milk exits $e$, the inner periphery of the cone $h$ conveying separated cream upward to the cream exits $c$. The clamping bolt $b$ is hollow and forms a milk inlet, and has at its lower part openings $p$ through which entering milk may be sprayed into the interior of the bowl $g$.

My improved liner is composed of a vertical series of separated superposed truncated cones $n$, being spaced apart by means of the studs $r$. I have shown in the drawings these separating cones as having a curve of the same radius for a purpose to be hereinafter described. But said cones may, if desired, be otherwise formed without changing the principle of my invention.

The lowermost cone $n'$ of said vertical series is fixedly connected to the lower corners of the vanes $m$ of the cylinder $l$. All of the cones $n$ as well as the lowermost cone $n'$ have radial slots $o$ in communication with their central openings $s$. The device which I have adopted for holding said cones in a certain fixed alinement is the cylinder $l$ having a plurality of vertical wings or vanes $m$. The hollow cylinder $l$ is adapted to slip over and fit the exterior periphery of the clamping bolt $b$ concentrically therewith and its outer periphery is spaced away from the inner edges of the cones $n$ to afford concentric spaces $s$ within which is the cream zone of the bowl. The vanes $m$ have a sufficient radial projection to cause them to extend a short distance within the inner portion of the slots $o$ contacting with the inner edges of said slots and holding all of said cones when placed thereover so that the openings $o$ all register vertically and form continuous channels for the passage therethrough of ascending currents of separating milk.

When the separating cones $n$ are thus properly placed in the bowl over the lowermost cone $n'$ so that the vanes $m$ will cause all their apertures $o$ to register and the cover $f$ is clamped down on the bowl, the liner is in operative position. Being set into rapid rotation, the milk is introduced into said bowl through the inlet $b$ and passes through the openings $p$ radially outward toward the cone $n'$ and then moving upward through the apertures $o$ in the cones $n$. Portions of the separating milk then move outward along the surfaces of said cones to the inner periphery of the bowl along which the skimmed milk moves upward to the conduit *i* and milk exits *e*. The cream which is separated in this process moves inwardly to the cream zone and then upward to the cream exits *c*. When the cones are somewhat curved on the same radius as shown their interspaces gradually diminish in height from the inner edges of said cones outwardly and the effect of the gradual approximation of the surfaces of said cones is to cause a progressive baffling of the separating outwardly moving milk thereby aiding in the separation of the minuter particles of cream in the milk in the outer zone of the bowl.

By the means shown the separating cones are not only provided with channels for the ascending currents of separating milk in what is called the neutral zone of the bowl but such cones are kept in the same alinement and nevertheless are readily detachable when it is desired to disassemble the liner. All the parts of the liner are thus easily assembled or disassembled for the purpose of cleaning or use and being of simple are of inexpensive construction.

Having described my invention, what I claim as new, and desire to secure by Letters Patent, is—

A liner for a centrifugal cream separator, consisting in combination, of an axial inlet tube having discharge openings at its lower end, a removable cylinder seated concentrically about said inlet tube above the latter's discharge openings and provided with vertical radial vanes, a vertical series of hollow frusta, spaced apart, seated about said removable cylinder detachably and spaced apart therefrom with the exception of the lowermost frustum which has its inner edge fixedly attached to the lower ends of said radial vanes, all of the frusta having inner marginal radial slots adapted to receive said radial vanes to provide vertical channels for the full milk in the neutral zone of the bowl.

Signed at Waterloo, Iowa, this 26th day of Nov. 1906.

THOMAS W. MORGAN.

Witnesses:
M. E. KENNEDY,
G. C. KENNEDY.